Oct. 27, 1942.  R. T. WHITZEL  2,300,141
REMELTING METHOD AND APPARATUS
Filed July 25, 1940
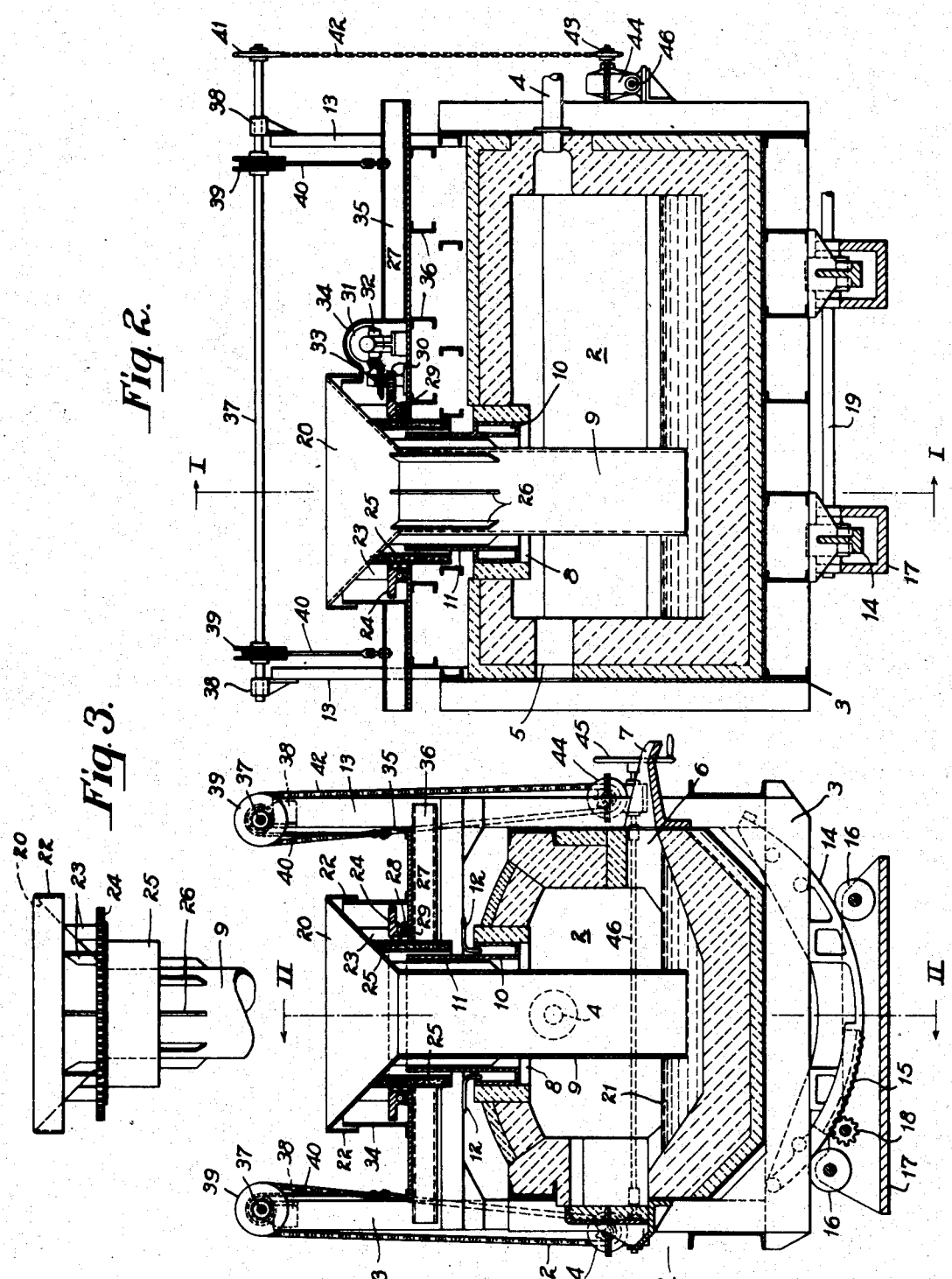
INVENTOR
Raymond T. Whitgel
BY
ATTORNEY Patented Oct. 27, 1942

2,300,141

UNITED STATES PATENT OFFICE 2,300,141

REMELTING METHOD AND APPARATUS

Raymond T. Whitzel, Massena, N. Y., assignor to Aluminum Company of America, Pittsburgh, Pa., a corporation of Pennsylvania Application July 25, 1940, Serial No. 347,462

6 Claims. (Cl. 75—65)

This invention relates to the recovery of aluminum and more particularly it is concerned with the remelting of relatively finely divided scrap of that metal.

In the fabrication of aluminum articles, a considerable amount of scrap metal is produced in the form of scalpings, turnings, borings, chips, sawdust, and the like. These generally consist of quite small pieces, but in the aggregate they comprise a considerable amount of metal, and it generally is desirable that this scrap metal be recovered.

The recovery of this scrap metal generally requires its remelting. In the remelting of aluminum scrap, it is known to introduce the scrap particles below the level of a body of molten aluminum in a remelting furnace by means of a tube in order to avoid excessive metal losses by reason of oxidation, and to utilize the furnace heat to drive off volatilizable substances contaminating the scrap metal without subjecting it to the furnace flames. However, this known method of remelting has the disadvantages that it involves mechanical feeding of the scrap metal through the tube and depends entirely upon conduction of heat within the quiescent body of molten metal to melt the solid scrap material being introduced into the remelting furnace.

The expedient of charging the scrap metal through a tube into the furnace below the surface of the melt has the further disadvantage that the scrap particles generally accumulate around the point of discharge causing loss of heat from the surrounding molten metal. This heat loss may become so great that, although the metal in the furnace at the point of discharge may be highly heated, the heat in that part of the melt adjacent the tube opening may become insufficient to fuse the scrap metal as it is charged into the furnace, and there may even be some solidification of the metal in the melt. This, of course, greatly retards the rate at which the scrap may be remelted and recovered.

The object of this invention is to provide an improved method and apparatus suitable for use in the remelting of relatively finely divided particles of aluminum. More particularly, the object of the invention is to devise a method and apparatus by which such particles are charged through a tube into a remelting furnace at a point below the surface of a bath of molten metal contained therein in a manner that increases both the rate of flow through the tube and the rate at which the aluminum particles become molten.

I have found that these and other objects may be accomplished by providing a rotatable tube, preferably vertically disposed, through which the aggregates of scrap aluminum may be charged into a melting furnace and below the surface of a body of molten metal contained in the furnace.

While the relatively fine particles of scrap metal are being charged into the melting furnace through the tube, the tube is rotated at a suitable speed to prevent congestion of the aggregates of aluminum scrap within the tube, and to cause the metal particles to pass through the tube at a rate calculated to allow time for volatilization of low boiling point impurities from the scrap without excessive oxidation of the metal and regulated by the rate of rotation of the tube. The rotary motion of the tube also maintains convection currents within the body of molten metal into which the scrap particles are being charged. These currents are sufficient to cause the molten metal to flow from the more highly heated portions of the furnace toward the tube, where contact with the newly discharged aggregates of scrap metal quickly effects their fusion; yet the currents are not sufficient to produce turbulence and the resulting oxidation of the melt. The movement of the tube and the metal currents thereby created also move the scrap particles to be melted toward more highly heated portions of the furnace and also prevent the accumulation of the aggregates and too great local cooling of the melt adjacent the tube. Since the scrap is charged into the melt below the surface of the molten metal, the scrap particles are prevented from lying upon the surface of the melt where they would be subject to oxidation by the direct heat of the furnace flames.

The charging tube which I use in the practice of my invention should be of relatively large diameter in order that the scrap aluminum particles to be charged into the melting furnace may pass through the tube without obstruction and so that suitable convection currents in the body of molten metal may be maintained. For example, I have found a tube having a diameter of from about 16 to about 24 inches quite satisfactory for use in the charging of aluminum scrap such as borings, turnings, and sawdust into a 3000 pound capacity furnace.

A material having a higher point of fusion than the aluminum to be melted must, of course, be used in the construction of the charging tube, and the material should be able to resist the high temperatures within the furnace. In addition, the charging tube should be made from a material which has practically no deleterious effect upon the metal to be melted and yet which is able to withstand the action of the molten aluminum. Cast iron has been found to be a suitable material for the tube construction when aluminum is to be melted in the furnace.

The practice of my invention in connection with a particular type of tilt furnace may be illustrated with reference to the accompanying drawing, in which:

Fig. 1 is a transverse section of the furnace;

Fig. 2 is a longitudinal section of the furnace taken along lines II—II of Fig. 1; and Fig. 3 is a fragmentary view showing a preferred form of the charging tube utilized in the invention.

In the embodiment of the invention illustrated, a furnace 1, which is constructed from a suitable refractory material and has a melting chamber 2, is maintained within a frame 3. The wall of the furnace is provided with at least one suitable burner 4, with an exhaust port 5, and also with a discharge orifice 6 having a pouring spout 7. In the roof of the furnace a large aperture 8 is provided through which a charging tube 9 passes into the melting chamber. This aperture and the charging tube are encircled by a cooling chamber 10 and by a cylindrical extension member 11. The cooling chamber is adapted to maintain a coolant introduced into and removed from the chamber through the pipes 12. At each corner of the furnace an upright member 13 extends from the frame 3 above the plane of the top of the furnace.

Integral with the frame of the furnace are a number of rockers 14, the undersides of which are rounded and are provided with rack portions 15. These rockers, with their superimposed furnace structure, are adapted to rest upon the rollers 16 of supporting cradle members 17. Pinions 18 also are provided upon the cradle members. These are driven through the shaft 19 by a suitable mechanism, not shown, and they cooperate with the rack portions of the rockers whereby rotation of the pinions effects a rocking or tilting motion to the rockers and a corresponding motion to the furnace structure.

The vertically disposed charging tube 9, referred to above, is provided at its upper end with a hopper 20. The lower end of the tube extends to a point below the surface of a body of molten metal 21 contained in the melting chamber of the furnace. The hopper may be fitted with a turned-down flange 22 and is provided with a number of depending ribs 23 carrying a ring gear 24 which encircles the charging tube. Also provided upon the depending ribs is a baffle 25 which likewise encircles the charging tube as well as the cylindrical extension member 11 and which is constructed of a material adapted to protect the ring gear from the furnace heat. This baffle 25 cooperates with the extension member 11 to prevent excessive heat loss through the opening 8. The charging tube also may have strengthening ribs 26.

The charging tube is supported upon a platform 27 by means of a bearing runway 28 upon which the ring gear 24 of the charging tube rests. This runway encircles the charging tube and is provided with a bearing race 29 in order that the ring gear may revolve upon the runway during rotation of the charging tube.

A suitably journalled gear 30, which meshes with the ring gear 24, also is provided upon the platform. This gear 30 is adapted to be driven from a suitable motor 31, having a speed reducer 32, through the beveled gears 33, whereby the ring gear and the charging tube are rotated at a desired rate. A shield 34 preferably is provided to cover the ring gear and the associated mechanism by which the ring gear and the charging tube are driven.

The platform 27 may include two sets of channel members. The top channels 35 extend longitudinally over the top of the furnace and rest upon transverse channel members 36. These channel members are disposed so that they intersect adjacent the corner upright members 13, the intersecting channels slidingly engaging the upright members at their points of intersection. By this construction, the intersecting channel members are guided against the corner uprights during vertical movement and the platform is restrained against lateral movement when it is raised or lowered.

A pair of parallel shafts 37 are journalled in bearing brackets 38 that are secured to the upper ends of the corner uprights 13, and each shaft is provided adjacent the uprights 13 with a pair of flat reels 39, upon which are wound the flexible cables 40. The ends of the cables 40 are attached to the platform 27 and are adapted to hold the platform in suspended position at any desired elevation. Each shaft 37 also is provided with a sprocket wheel 41 that is connected by a chain 42 with a sprocket wheel 43 on the driven shaft of a worm gear device 44 secured to the frame of the furnace. The worm gear devices 44 are adapted to be driven in unison by means of a suitable crank or hand wheel 45 that is connected thereto through a shaft 46. By the rotation of the crank 45, the rotation of the sprocket wheels 41 and 43 and of the shafts 37 is effected, causing the cables 40 to wind upon the reels and thereby effecting elevation of the platform 27.

In the operation of the remelting apparatus, the fine aggregates of scrap aluminum are charged into the hopper 20, from whence they pass downwardly through the tube 9 and are discharged beneath the surface of the molten aluminum 21 within the furnace chamber. During the movement of the aluminum particles through the tube, oil and moisture and other foreign matter having a low boiling point are caused by the furnace heat to volatilize; yet the aluminum particles pass through the tube with sufficient speed that the furnace heat does not cause oxidation of the metal. The tube protects the particles from the burners as the fine aggregates of the metal pass downwardly, and the coolant flowing through the cooling chamber 10 in the furnace roof adjacent the periphery of the tube serves to prevent the heat within the tube from becoming excessive.

When the molten charge is ready to be removed from the furnace, the pinions 18 are caused to rotate. Since the pinions engage the rack portion of the rockers 14, their rotation actuates the rockers and causes the furnace structure to tilt. The molten metal then may be poured from the furnace through the discharge orifice 6.

The charging tube may be removed from the furnace by the elevation of the supporting platform 27. Ordinarily the platform rests upon the frame of the furnace but its position with respect to the top of the furnace may be adjusted since the cables 40 from which the platform is suspended may be wound onto the flat reels, thereby raising the platform.

The term "scrap" as used herein will be understood to refer to scalpings, turnings, borings, chips, sawdust, and the like produced as an incident to the fabrication of articles of aluminum, and by the term "aluminum" is meant alloys containing more than 50 per cent of aluminum as well as the pure metal.

Although I have described the process of my invention as practiced in the operation of a particular type of tilt furnace, it will be realized that the invention may be utilized to prevent oxidation losses and to accelerate the remelting of fine aggregates of scrap aluminum in furnaces of other types. Various modifications of the invention also will appear to those skilled in the art, and it will be understood that such modifications are within the purview of my invention as it is defined in the appended claims.

I claim:

1. The method of melting relatively fine particles of scrap metal, which method comprises charging said particles through a tube into a melting furnace and below the surface of a body of molten metal contained in said furnace while rotating said tube to prevent congestion of said particles within and about the tube and to maintain convection currents in said body of molten metal.

2. The method of melting relatively fine particles of scrap aluminum, which method comprises charging said particles of scrap aluminum through a tube into a melting furnace and below the surface of a body of molten metal contained in said furnace while rotating said tube to prevent congestion of said particles of scrap aluminum within and about the tube and to maintain convection currents in said body of molten metal.

3. The method of melting relatively fine aggregates of aluminum scrap, which method comprises charging said aggregates through a large diameter tube into a melting furnace and below the surface of a body of molten aluminum contained in said furnace, the rate of charge being adapted to permit volatilzation of low boiling point impurities from said aggregates as said aggregates are charged through the tube, the aggregates being protected against oxidation from furnace heat by said tube, the tube being rotated to prevent congestion of said aggregates and to maintain convection currents in said body of molten aluminum.

4. An apparatus for the melting of relatively fine aggregates of scrap aluminum, said apparatus comprising a melting chamber adapted to maintain a body of molten metal, and a charging tube extending below the surface of a body of molten metal contained in said melting chamber, said tube being adapted for the passage therethrough of said aggregates of scrap aluminum during the charging of the melting chamber, means for rotating said charging tube while said aggregates are being charged into said melting chamber whereby congestion of said aggregates within the tube is prevented and convection currents are maintained in the body of molten metal contained in the melting chamber.

5. An apparatus for the melting of relatively fine aggregates of scrap aluminum, said apparatus comprising a closed melting chamber adapted to contain a body of molten metal, said melting chamber being provided with an aperture, an open charging tube passing through the aperture of said chamber to a point beneath the surface of a body of molten metal contained in said melting chamber, the tube being of large diameter for the passage therethrough of said aggregates of scrap aluminum during charging of the melting chamber, and means for rotating said tube while said aggregates are being charged into said melting chamber whereby congestion of said aggregates within the tube is prevented and convection currents are maintained in the body of molten metal within the melting chamber.

6. An apparatus for the melting of relatively fine aggregates of scrap aluminum, said apparatus comprising a closed melting chamber adapted to contain a body of molten metal, the top of said melting chamber being provided with an aperture, an open substantially vertical charging tube passing through the aperture in the top of said melting chamber and having an opening at a point beneath the surface of the body of molten metal contained therein, means for supporting said charging tube, means for raising and lowering said supporting means whereby the position of the opening of said tube may be adjusted within said body of molten metal, and means for rotating said tube while said aggregates are being charged through the tube into the melting chamber whereby congestion of said aggregates within the tube is prevented and convection currents are maintained in the body of molten metal within the melting chamber.

RAYMOND T. WHITZEL.